US012707445B2

(12) United States Patent
Peterson et al.

(10) Patent No.: US 12,707,445 B2
(45) **Date of Patent: *Aug. 11, 2026**

(54) BAND AGILE MOBILE BROADBAND RADIO, SYSTEM AND METHODS OF OPERATION

(71) Applicant: Fenix Group, Inc., Chantilly, VA (US)

(72) Inventors: David Peterson, Haymarket, VA (US); Stefan Schaner, Ashburn, VA (US); Aaron Hoogland, Centreville, VA (US)

(73) Assignee: Fenix Group, Inc., Chantilly, VA (US)

( * ) Notice: Subject to any disclaimer, the term of this patent is extended or adjusted under 35 U.S.C. 154(b) by 405 days.

This patent is subject to a terminal disclaimer.

(21) Appl. No.: 18/407,269

(22) Filed: Jan. 8, 2024

(65) Prior Publication Data

US 2024/0188056 A1 Jun. 6, 2024

Related U.S. Application Data

(63) Continuation of application No. 18/078,683, filed on Dec. 9, 2022, now Pat. No. 11,871,393, which is a continuation of application No. 16/805,780, filed on Mar. 1, 2020, now Pat. No. 11,533,724.

(60) Provisional application No. 62/812,640, filed on Mar. 1, 2019.

(51) Int. Cl.

*H04W 72/0453* (2023.01)
*H04B 1/40* (2015.01)

(52) U.S. Cl.

CPC .......... *H04W 72/0453* (2013.01); *H04B 1/40* (2013.01)

(58) Field of Classification Search

CPC ............................ H04W 72/0453; H04B 1/40
See application file for complete search history.

(56) References Cited

U.S. PATENT DOCUMENTS

| | | | | |
|---|---|---|---|---|
| 9,473,181 | B1 * | 10/2016 | Takano | H04B 7/0408 |
| 2012/0099663 | A1 * | 4/2012 | Sabol | H04W 24/04 375/259 |
| 2014/0241277 | A1 | 8/2014 | Suzuki et al. | |
| 2018/0352594 | A1 * | 12/2018 | Iwai | H04L 47/825 |
| 2018/0358938 | A1 | 12/2018 | Ayranci et al. | |
| 2019/0053000 | A1 | 2/2019 | Filippou et al. | |
| 2019/0199457 | A1 * | 6/2019 | Chopra | H04B 7/088 |
| 2019/0322326 | A1 * | 10/2019 | Summer | B25J 5/005 |

(Continued)

*Primary Examiner* — Raymond S Dean
(74) *Attorney, Agent, or Firm* — Polsinelli PC

(57) ABSTRACT

Disclosed is a wireless communication station including an edge server configured to establish a wireless connection with a network and receive first and second data from the network, and a baseband radio configured to receive the first and second data from the edge server and convert the first and second data to first and second digital transmission data. The wireless communication station further includes first and second radio frequency (RF) front end modules removably attached to the baseband radio and operable in first and second frequency bands, respectively, and configured to receive the first and second digital transmission data, convert the first and second digital transmission data to first and second RF transmission data, and transmit the first and second RF transmission data. The edge server, the baseband radio, and the first and second RF front end modules are provided in the housing, and the first and second frequency bands are different.

20 Claims, 8 Drawing Sheets

(56) References Cited

U.S. PATENT DOCUMENTS

| | | | |
|---|---|---|---|
| 2019/0339396 | A1* | 11/2019 | Turunen .................. G01S 19/20 |
| 2020/0099503 | A1 | 3/2020 | Khan |
| 2020/0136657 | A1 | 4/2020 | Anderson et al. |

* cited by examiner

BAND AGILE MOBILE BROADBAND RADIO, SYSTEM AND METHODS OF OPERATION

CROSS-REFERENCE TO RELATED APPLICATIONS

This application is a continuation U.S. Non-Provisional application Ser. No. 18/078,683, filed Dec. 9, 2022, of which is a continuation of U.S. Non-Provisional application Ser. No. 16/805,780, filed Mar. 1, 2020, which claims the benefit of priority under 35 U.S.C. § 119 to U.S. Provisional Application No. 62/812,640, filed Mar. 1, 2019, in the United States Patent and Trademark Office, the entire contents of which are hereby incorporated by reference.

FIELD

The present disclosure relates to the incorporation of multiple communication modes and network services in a single self-contained unit. More particularly, the present disclosure relates to a single device that is capable of hosting and operating network services and multiple communications devices which transmit and receive over various communication modalities.

BACKGROUND

Wireless broadband communications for mobile devices provide convenient and reliable means of communications. For example, LONG-TERM EVOLUTION™ (LTE) communication systems are used to provide voice and data communications between various users and allow applications running on mobile devices to access data and/or other applications and programs.

Cellular base stations are used to establish communication links or channels between a mobile device and a baseband radio of the cellular base station. Cellular base stations can provide multiple radio channels to establish communication links with multiple mobile devices located within the coverage area of the cellular base station (e.g., the cell cite or macrocell of the cellular base station).

Cellular base stations are often fixed to a radio mast (or cell tower) which in turn fixes the coverage area of the cellular base station. Mobile devices configured for communications with a particular wireless broadband communication network are thus constrained for communications limited to the coverage area provided by cellular base stations of the network.

To extend service coverage of a communication network, additional cellular base stations may be added. However, providing additional macrocells may be impractical in many situations, such as due to cost, environmental concerns, etc. To extend and/or supplement coverage at discrete smaller locations (such as in a home, small business, geographically challenged coverage locations), a small cell, such as a microcell, picocell or femtocell may be used. Such microcells are formed from a small, low-power cellular base station and allow service provides to extend service coverage indoors or at the edges of a macrocell. Microcell base stations provide wireless broadband communications with the same communication network system and may use the same licensed spectrum of the cellular system of the mobile network communications provider. Microcell base stations must thus avoid interference with neighboring macrocells and are typically limited in power and communication range, often limiting use to a small number of mobile devices. Further, microcells may require installation of an access point and thus are unsuitable for providing mobility of the network coverage area.

The variety of communications systems used may also require network services to bridge connectivity, monitor equipment and communication status, and provide updates and repairs.

SUMMARY

Exemplary embodiments of the disclosure provide a mobile broadband communication system with band agility. A mobile cellular base station (e.g., portable and/or mountable on a vehicle) is provided with several MIMO RF front end modules operating at different RF carrier frequencies. The mobile cellular base station may use a selected subset (e.g., one) of the RF front end modules to provide communication links to multiple users using standard mobile devices (e.g., cell phones or other handheld devices) and establish communications therebetween. Switching between the RF front end modules may be done automatically or by a user. Further, the MIMO RF front end modules may be detachable so that different RF carrier families may be used with the same baseband radio to support use within different environments.

In some exemplary embodiments, the present disclosure is directed to a method of operating a mobile wireless communication station comprising an edge server, a digital broadband radio, and a plurality of radio frequency (RF) front end modules detachably connected to the digital broadband radio, each of the plurality of RF front end modules having a different operating frequency band, the method comprising: identifying a first RF front end module of the plurality of RF front end modules for establishing a first wireless communication link at a first RF frequency band with a user device; receiving, by the digital broadband radio, first data for transmission to the user device; converting, by the digital broadband radio, the first data into first digital transmission data; sending the first digital transmission data to the first RF front end module; converting, by the first RF front end module, the first digital transmission data to first RF transmission data at the first RF frequency band; and transmitting, by the first RF front end module, the first RF transmission data to the user device via the first wireless communication link.

In some exemplary embodiments, the present disclosure is directed to a wireless communication station for wireless communication, comprising: a housing; an edge server configured to establish a wireless connection with a backend network and receive first data from the backend network for wireless transmission to a user device; a baseband radio configured to receive the first data from the edge server and convert the first data to first digital transmission data; a plurality of radio frequency (RF) front end modules removably attached to the baseband radio, each of the plurality of RF front end modules operable in respectively different frequency bands, the plurality of RF front end modules including a first RF front end module configured to receive the first digital transmission data from the baseband radio, convert the first digital transmission data to first RF transmission data, and transmit the first RF transmission data to the user device; and a plurality of RF antennas respectively corresponding to the plurality of RF front end modules, wherein the edge server, the baseband radio, and the plurality of RF front end modules are provided in the housing.

In some exemplary embodiments, the present disclosure is directed to a wireless communication station for wireless communication, the wireless communication station comprising: a housing; an edge server configured to establish a wireless connection with a backend network and receive first data and second data from the backend network for wireless transmission to a user device; a baseband radio configured to receive the first data from the edge server, convert the first data to first digital transmission data, receive the second data from the edge server, convert the second data to second digital transmission data; a first radio frequency (RF) front end module removably attached to the baseband radio and operable in a first frequency band, the first RF front end module configured to receive the first digital transmission data from the baseband radio, convert the first digital transmission data to first RF transmission data, and transmit the first RF transmission data to the user device; and a second RF front end module removably attached to the baseband radio and operable in a second frequency band, the second RF front end module configured to receive the second digital transmission data from the baseband radio, convert the second digital transmission data to second RF transmission data, and transmit the second RF transmission data to the user device, wherein the edge server, the baseband radio, and the first and second RF front end modules are provided in the housing, and wherein the first frequency band is different from the second frequency band.

The mobile cellular base station may be deployed to quickly establish an edge broadband communications network within a corresponding cell formed by the mobile cellular base station. Connection to an access point may be unnecessary in certain implementations.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

DETAILED DESCRIPTION

Figure 1:
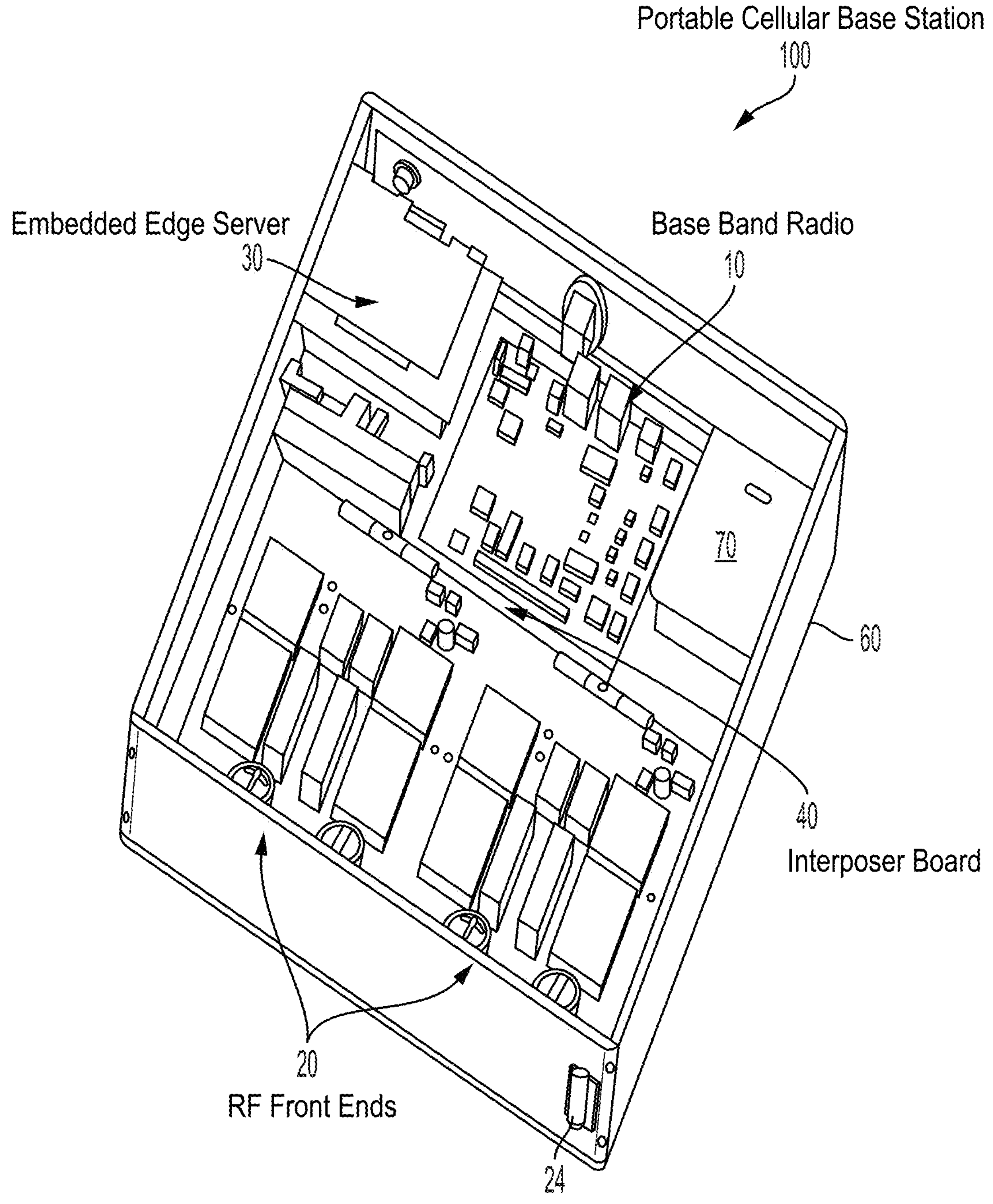
FIG. 1 is a perspective illustration of an exemplary portable cellular base station, according to certain example embodiments.

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

It will be appreciated that the use of the same or similar reference numerals indicates the same or similar structure and thus associated description is typically relevant to all such same/similar structure. Use of suffixes for reference numerals (e.g., "a" for reference numeral "100-*a*") is used when several similar structures are provided and/or variations are implemented between similar structures. Generic use of a reference numeral without a suffix (e.g., just "100") may refer individually to all such structures (e.g., each of 100-1, 100-2 . . . 100-*n*).

In the drawings, different figures show various features of exemplary embodiments, these figures and their features are not necessarily intended to be mutually exclusive from each other. Rather, certain features depicted and described in a particular figure may also be implemented with embodiment(s) depicted in different figures, even if such a combination is not separately illustrated. Referencing such features/figures with different embodiment labels (e.g. "first embodiment") should not be interpreted as indicating certain features of one embodiment are mutually exclusive of and are not intended to be used with another embodiment.

Unless the context indicates otherwise, the terms first, second, third, etc., are used as labels to distinguish one element, component, region, layer or section from another element, component, region, layer or section (that may or may not be similar). Thus, a first element, component, region, layer or section discussed below in one section of the specification (or claim) may be referred to as a second element, component, region, layer or section in another section of the specification (or another claim).

It will be understood that when an element is referred to as being "connected," "coupled to" or "on" another element, it can be directly connected/coupled to/on the other element or intervening elements may be present. In contrast, when an element is referred to as being "directly connected" or "directly coupled" to another element, or as "contacting" or "in contact with" another element, there are no intervening elements present.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

Figure 2:
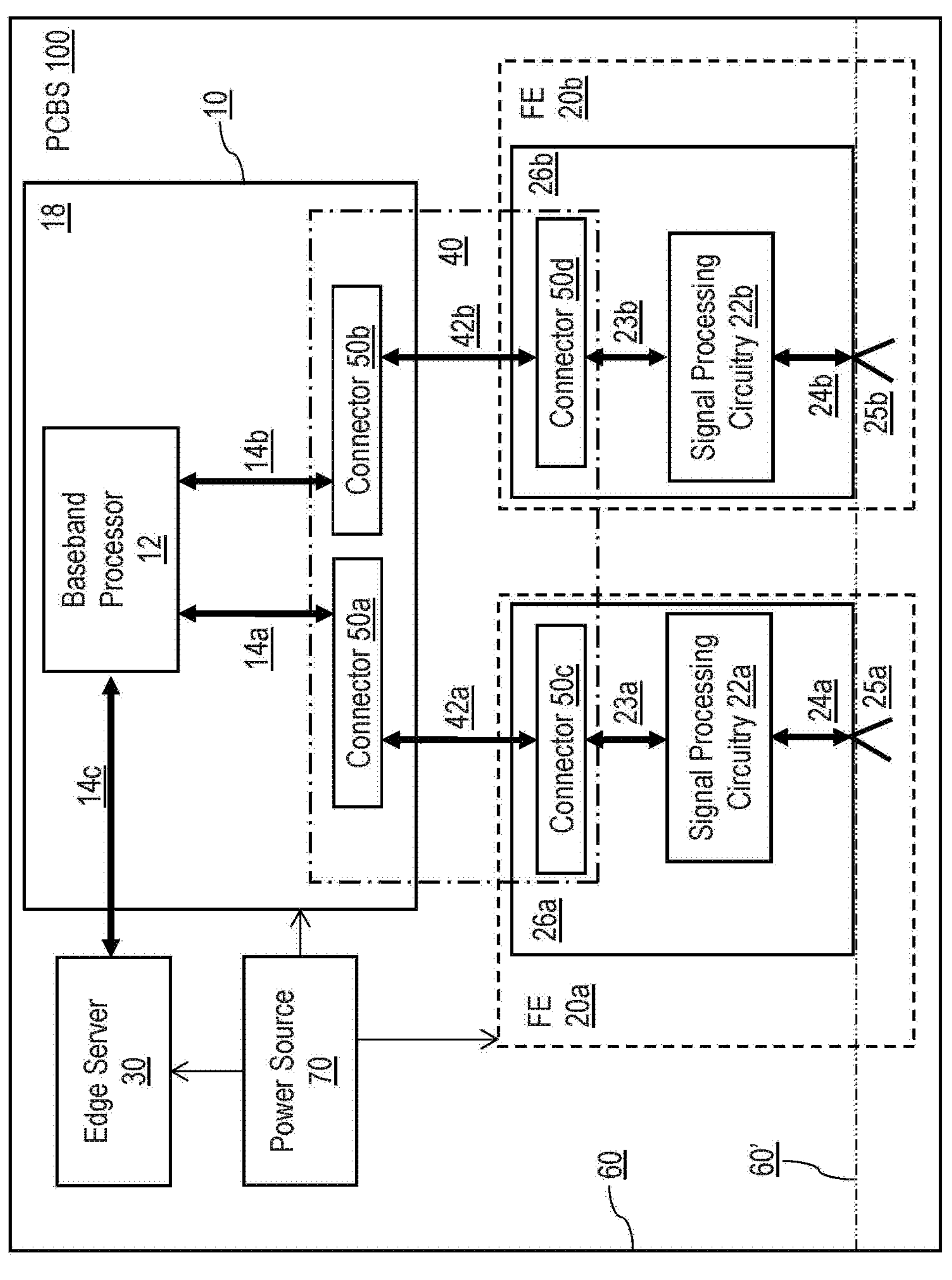
FIG. 2 is a block diagram of the exemplary portable cellular base station of FIG. 1, according to certain example embodiments.

FIG. 1 shows a perspective view and FIG. 2 is a block diagram representing an exemplary portable cellular base station (PCBS) 100, according to some embodiments. The PCBS 100 may be a cellular base station having a smaller form factor, such that it is capable of being easily moved or transported from one location to another.

The PCBS 100 may include a baseband radio 10, a plurality of RF front end modules 20, and an embedded edge server 30. The plurality of RF front end modules 20 each may comprise a MIMO (multi-input multi-output) RF transceiver, and may operate at different RF carrier frequencies from one other. The RF front end modules 20 may be detachably connected to the baseband radio 10 to provide signal communications therebetween in the form of binary digital data (which may form a voice signal between two end users, or application data, etc.).

As shown in FIG. 2, baseband radio 10 may comprise a baseband processor 12 and busses 14*a*, 14*b*, and 14*c* formed on a printed circuit board 18. Each RF front end module 20 may include signal processing circuitry 22, bus 23, an RF waveguide 24 (e.g., coaxial cable), and a printed circuit board 26. In addition, the PCBS 100 may include one or more RF antennas 25 corresponding to each RF front end module 20. For example, in FIGS. 1 and 2, RF front end modules 20*a* and 20*b* are each provided with one RF antenna 25.

The signal processing circuitry 22, bus 23, and RF waveguide 24 may be mounted on and/or be formed as elements of the printed circuit board 26. Signal processing circuitry 22 of each RF front end module 20 may exchange binary digital data with baseband processor 12 of baseband radio 10. More specifically, each RF front end module 20 may receive I and Q signals in digital binary form from the baseband processor 12, and may convert the same to an RF electrical signal which is then used to drive antenna 25 to emit an RF electromagnetic wave. In addition, each RF front end module 20 may receive an RF electromagnetic wave from one or more external sources via antenna 25, and may convert the same to an RF electrical signal, which is then converted to I and Q signals in digital binary form and transmitted to the baseband processor 12. The transmitted and received RF electromagnetic waves may form a plurality of wireless links to a plurality of user devices (e.g., in the form of an OFDM RF electromagnetic signal).

The baseband processor 12 may be a processor that converts data, which is input from the edge server 30, into signals that can be used to modulate the carrier frequency for transmission. In addition, the baseband processor 12 may convert signals received from the detachable, modular RF front end modules 20 into digital data that is then transmitted to edge server 30 for further processing. For example, in performing wireless transmission, the baseband processor 12 may convert binary data to input symbols (complex values representing a mapped constellation point to specify both amplitude and phase of a sinusoid for a subcarrier). For example, QAM source data may be mapped onto N orthogonal subcarriers that are "orthogonal" to each other (in an OFDM signal). The baseband processor 12 may perform digital signal processing, such as IFFT (inverse fast Fourier transform) to generate the summation of the plurality of sinusoids of different subcarriers and provide OFDM symbols in the form of I and Q digital data (forming a complex number (I+jQ) that represent an OFDM symbol). In performing wireless receiving, the baseband processor may perform the reverse process and convert I and Q digital data (forming a complex number (I+jQ) that represents an OFDM symbol) that has been received from an RF front end module 20 into a plurality of QAM data of N orthogonal subcarriers, which are then converted into N streams of data. Additional conventional processing may also be performed by the baseband processor 12 such as, for example, data scrambling, encoding, guard insertion, preamble insertion, etc., in connection with transmission, as well as the reverse processes in connection with receiving.

Figure 3A:
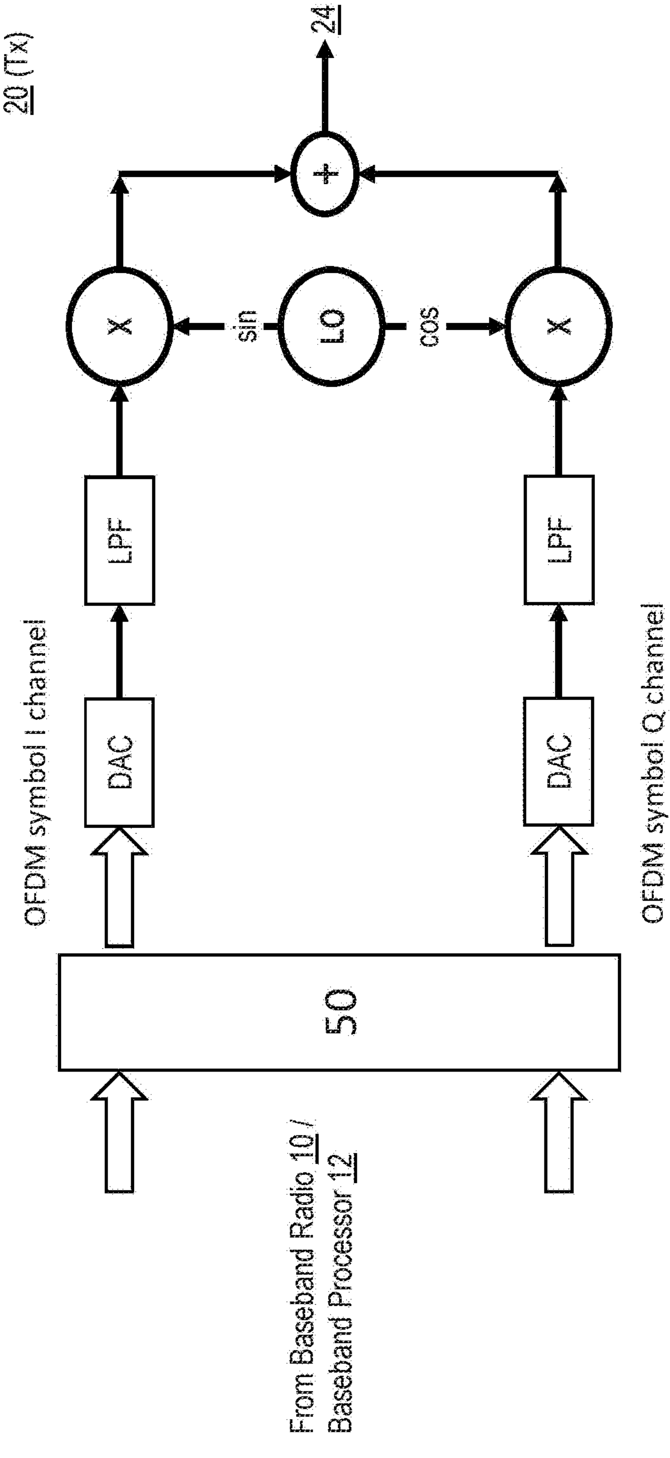
FIGS. 3A and 3B provide exemplary details of RF front end modules usable with the portable cellular base station, according to certain example embodiments.

The I and Q channel digital data provided by the baseband processor 12 may be received by a selected one of the front end modules 20, and converted into a corresponding OFDM RF signal by signal processing circuitry 22, which is then used to drive a corresponding antenna 25 to output a corresponding electromagnetic OFDM RF signal. With respect to the transmission side (see FIG. 3A), the signal processing circuitry 22 of a front end module 20 may comprise a digital to analog converter (DAC) to convert the I and Q channel digital data into corresponding I and Q analog signals. As noted, the I and Q channel digital data may form an OFDM symbol, and a sequential series of OFDM symbols may be used to generate an OFDM signal that forms a plurality of wireless links on a plurality of orthogonally spaced subcarriers about the RF carrier frequency. The signal processing circuitry 22 may comprise a local oscillator to generate an RF carrier signal and a quadrature mixer. After filtering by a low pass filter LPF, the I and Q analog signals output by the DAC may be quadrature mixed by the quadrature mixer with the RF carrier signal generated by the LO (modulated at an RF carrier frequency respectively offset by 90 degrees), with two upconverted components being summed together to provide the RF transmission signal on RF waveguide 24. The RF front end module 20 may thus generate an OFDM (orthogonal frequency-divisional multiplexing) RF signal which is then provided to antenna 25 and transmitted wirelessly to provide a plurality of wireless communication links to user devices.

Figure 3B:
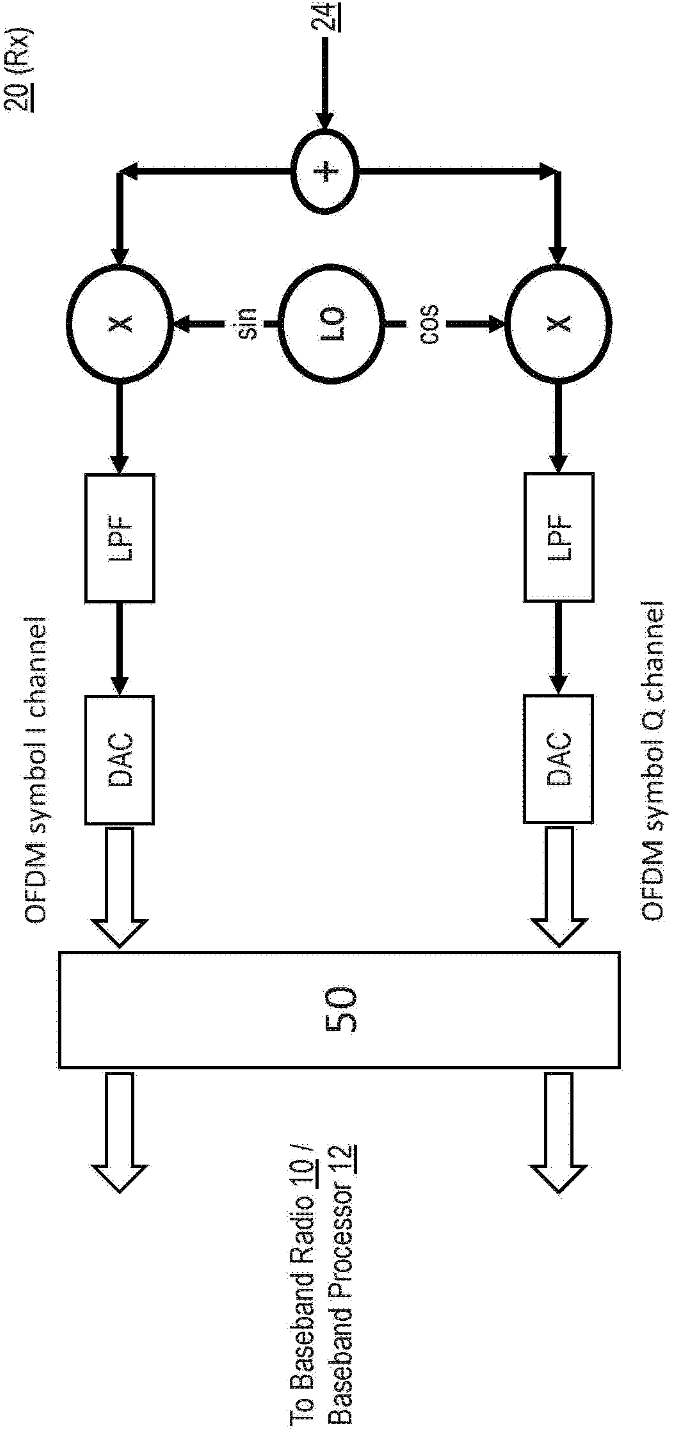

In performing wireless receiving, a reverse process may be performed. Antenna 25 may receive an RF electromagnetic signal which is provided as an RF electrical signal to the signal processing circuitry 22 via RF waveguide 24. As represented in FIG. 3B, the RF electrical signal provided by the RF waveguide 24 may be quadrature-mixed (with signals of the RF carrier frequency that are offset by 90 degrees from one another) which are then filtered by low pass filters LPF and digitized by analog to digital converters (ADC) to extract the real and imaginary components of the OFDM symbol (the I and Q channel digital data), which may then be transmitted to the baseband processor 12 of baseband radio 10. Other types of wireless communications may be used instead of or in addition to OFDM, such as time division multiplexing (TDM). In some implementations, the PCBS 100 may conform to LTE and the combination of the baseband radio 10 and one RF front end module 20 may correspond to an evolved base station (eNodeB or eNB) according to the LTE standard.

An interposer board 40 may connect the baseband processor 12 to the signal processing circuitry 22 of each RF front end module 20 to provide communications of the transmitted and received binary digital data therebetween. In some embodiments, interposer board 40 may include one or more busses 42 over which the baseband radio 10 and RF front end module 20 can transmit/receive digital data between the baseband radio 10 and RF front end module 20. For example, referring to FIG. 2, a first signal path may be formed between baseband processor 12 and signal processing circuitry 22*a* of the first RF front end module 20*a* via bus 14*a*, connector 50*a*, bus 42*a*, connector 50*c*, and bus 23*a*. A second signal path may be formed between baseband processor 12 and signal processing circuitry 2*ba* of the second RF front end module 20*b* via bus 14*b*, connector 50*b*, bus 42*b*, connector 50*d*, and bus 23*b*. Although separate signal paths are formed between the baseband processor 12 and corresponding front end modules 20*a* and 20*b*, a single shared signal path may be formed between the baseband processor 12 and multiple front end modules 20 (e.g., front end modules 20*a* and 20*b*) with address signals (or frontend selection signals) being used to select the front end module (e.g., front end modules 20*a* or 20*b*) to communicate with the baseband processor 12.

In some embodiments, signal path selection may be performed in software (e.g., a virtual core on the edge server 30) that "mates" the RF front end modules 20 to the baseband processor 12 of the baseband radio 10 via the interposer board 40. This process may occur when one or more RF front end modules 20 is physically swapped out (e.g., when one RF front end module 20 is physically replaced with another RF front end module 20). In other embodiments, the signal paths may be chosen in software operating on the edge server 30 to provide data to one or more RF front end modules 20 as defined by the user in software. In still further embodiments, signal path selection may occur automatically through the use of signal-to-noise (SNR) ratio monitoring. For example, the signal path may be changed from one RF front end module 20 to another RF front end module based on RF congestion or noise floor variables.

Each of the electrical connectors 50 may comprise a plug and socket connector having a first portion attached to the interposer board 40 and a second portion attached to either the printed circuit board 18 of the baseband radio 10 (as in the case of connectors 50*a* and 50*b*) or to a printed circuit board 26 of a corresponding RF front end module 20 (as in the case of connectors 50*c* and 50*d*). The interposer board 40 may thus provide a detachable electrical signal connection between the baseband radio 10 and the RF front end modules 20, and more specifically, between the processor 12 of the baseband radio 10 and the RF front end modules 20. For example, each of the two or more RF front end modules 20 may be detachably connected to the interposer board 40 and detachably connected to the baseband radio 10 through the interposer board 40, providing an electrical connection between the baseband radio 10 and the two or more RF front end modules 20 and allowing communication (transmission/reception) to be exchanged between the baseband radio 40 and the two or more RF front end modules 20. When the RF front end module 20 is detachably connected to the baseband radio 10, the RF front end module 20 may make an electrical connection with the bus 42 of the interposer board 40, thereby forming a communication path between the RF front end module 20 and the baseband radio 10. In some embodiments, the interposer board 40 may further provide an electrical power connection to the two or more RF front end modules 20, allowing power to be provided to the two or more RF front end modules 20 through the interposer board 40. The power may be provided by an internal power source 70. Although an interposer board 40 is used in this example to provide a detachable electrical connection, alternative structures may be used, such as plural flexible cables, each having portions of connectors attached at either end (e.g., a first cable forming bus 42*a* extending between connectors 50*a* and 50*c* and a second cable forming bus 42*b* extending between connectors 50*b* and 50*d*).

Edge server 30 may comprise a computer stack and may be configured to provide backend processing of the cellular network formed by PCBS 100. Although not illustrated, the edge server 30 and/or the computer stack can include one or more of the following components: at least one central processing unit (CPU) configured to execute computer program instructions to perform various processes and methods, including the processes and methods disclosed herein, random access memory (RAM) and read only memory (ROM) configured to access and store data and information and computer program instructions, input/output (I/O) devices configured to provide input and/or output (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored.

The computer stack of the edge server 30 may host multiple Virtual Machines ("VMs") which run software instances at the edge, thereby removing the need for connectivity to a higher echelon network for subscription services, which include, but are not limited to the following: an Evolved Packet Core ("EPC"); a situational awareness software server; a softphone application program; a voice and chat application; a streaming solution; an enhanced security layer server, providing onboard virtual private networks (VPNs); and a satellite communication ("SATCOM") situational awareness application. These VMs may act as the control unit not only for radio operations, but also for network service operations. In addition, the edge server 30 may further include a hypervisor application that operates and monitors the VMs.

The situational awareness software server may include a geospatial mapping engine, originally developed for the Android Operating System, which allows for precision targeting, surrounding land formation intelligence, situational awareness, navigation, and data sharing. The softphone application program may enable Voice over Internet Protocol ("VOIP") telephone calls from one or more computing devices. The voice and chat application may be an encrypted VoIP application, which allows users to talk to each other via the same server. The streaming solution may allow for a server/client that can stream and receive network streams. The SATCOM situational awareness application may include an encrypted web interface that enables centralized or remote monitoring and control.

Edge server 30 may be configured by software to form an evolved packet core (EPC) according to LTE. The software that configures the edge server 30 may be stored on one or more of the memory or storage media of the edge server 30, and may be executed by the at least one central processing unit (CPU) of the edge server 30. The EPC may be a framework for providing converged voice and data on a 4G LTE network. The EPC network elements may consist of the Mobility Management Entity ("MME"), Home Subscription Server ("HSS"), Serving Gateway ("S-GW"), Packet Gateway ("P-GW"), and policy and charging rules function server (PCRF server).

The MME module of the edge server 30 may perform security procedures such as end-user authentication and implementing ciphering and integrity protection algorithms. The MME module may also determine Quality of Service (QOS) of a particular wireless link. In some embodiments, the MME module may be responsible for selecting the RF front end module 20 through which the PCBS 100 will communicate with one or more user devices. In other embodiments, the RF front end module 20 may be selected using, for example, application layer software operating on the edge server 30. The application layer software may monitor the RF environment via a probe, including, for example, a dormant RF front end module 20. Monitoring the RF environment may include, for example, analyzing frequency band usage and/or the strength of signals that occupy a frequency band that is currently being used by one of the RF front end modules 20 or a frequency band that may be used by another of the RF front end modules 20.

The HSS module may be a database that contains user-related and subscriber-related information. The HHS module may provide support functions in mobility management, call and session setup, user authentication and access authorization. For example, the HHS module may perform user identification and addressing (e.g., in referencing a database of mobile subscriber ISDN numbers or mobile telephone numbers), as well as determine related user profile information associate with an identified user (e.g., subscriber information such as allowed traffic class, maximum bit rate, Quality of Service, etc.).

The edge server 30 may communicate with baseband processor 12 via bus 14*c*. For example, the edge server 30 may transmit data to and receive data from the baseband processor 12 of the baseband radio 10 via bus 14*c*. Bus 14*c* may be formed on printed circuit board 18 of the baseband radio 10, and may extend to connect to the edge server 30 (e.g., through connectors (not shown)).

The baseband radio 10, the front end modules 20, the edge server 30, and the interposer module 40 may be located within a single housing 60, which may encase the elements of the PCBS 100. FIG. 1 illustrates a base of housing 60. Housing 60 may also include a cap (e.g., a flat plate) that connects to the base of housing 60. The cap and the base of housing 60 may be detachably connected together with fasteners, such as by clasps or screws, allowing a user to access an internal area of the housing 60 and modify the components of the PCBS 100 (as described elsewhere herein). Antennas 25 may be provided within housing 60 or outside housing 60, and may be connected to corresponding signal processing circuitry via the RF waveguide 24 (e.g., extending through housing 60 by connecting two coaxial cables with a coaxial connector—one shown in FIG. 1). For example, FIG. 2 illustrates an embodiment in which the antennas 25 are provided inside of housing 60 (represented by the solid line), as well as an embodiment in which the antennas are provided outside of housing 60 (represented by the dotted and dashed line adjacent to the printed circuit board 26). Housing 60 may be formed of a rugged material (e.g., molded epoxy resin or a metal casing) and may be environmentally sealed (e.g., waterproof).

An internal power source 70 may be provided within housing 60 to provide power to the components of the PCBS 100. For example, power source 70 may provide power to baseband radio 10, RF front end modules 20, and edge server 30. The power source 70 may be a primary source of power or may be a secondary source of power (e.g., a backup battery operable in response to detecting that a primary source of power outside the housing 60 is unavailable). In some embodiments, the power source 70 may be a rechargeable battery.

Each of the RF front end modules 20 may be physically detachably connected to housing 60. For example, pegs (not shown) extending from the base of housing 60 (below the RF front end modules 20 in FIG. 1) may extend through corresponding holes in the printed circuit boards 26 of the RF front end modules 20. Upper portions of the pegs may correspond in size (e.g., slightly smaller in diameter) with the corresponding holes in the printed circuit boards 26 through which they extend, while lower portions of the pegs may have a larger size than the corresponding holes to support the printed circuit board 26 and provide a spacing between the printed circuit board 26 and the bottom of the base of the housing 60. A fastener (not shown), such as a nut, may be attached to the smaller diameter pegs above the printed circuit board 26 to vertically fasten the printed circuit board in place. Horizontal movement of the printed circuit board 26 may be restricted by the pegs.

Each of the RF front end modules 20 may be operable at different RF carrier frequencies. Components of the RF front end modules 20 may thus be selected to operate at the RF carrier frequency of the RF front end module 20. For example, the local oscillator LO of each RF front end module may be configured to generate a different RF carrier frequency for the upconversion and downconversion signal processing described herein. Further, RF waveguides 24 and antennas 25 may have different sizes and/or configurations to optimize transmission/reception of RF signals (as described herein) at the RF carrier frequency of the RF front end module 20, where use of the same RF waveguides 24 and antennas 25 in another RF front end module 20 may act to filter and/or attenuate the RF signals to be transmitted/received. Because the RF front end modules 20 are detachably connected to the baseband radio 10 through, for example, interposer board 40, each RF front end module 20 may be replaced with another RF modules 20 that operates at a different frequency band than that of the RF front end modules 20 being replaced.

Figure 4A:
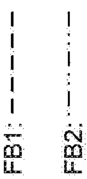
FIGS. 4A-4C diagrams illustrating operations in an exemplary communication system including the portable cellular base station, according to certain example embodiments.
Figure 4A:
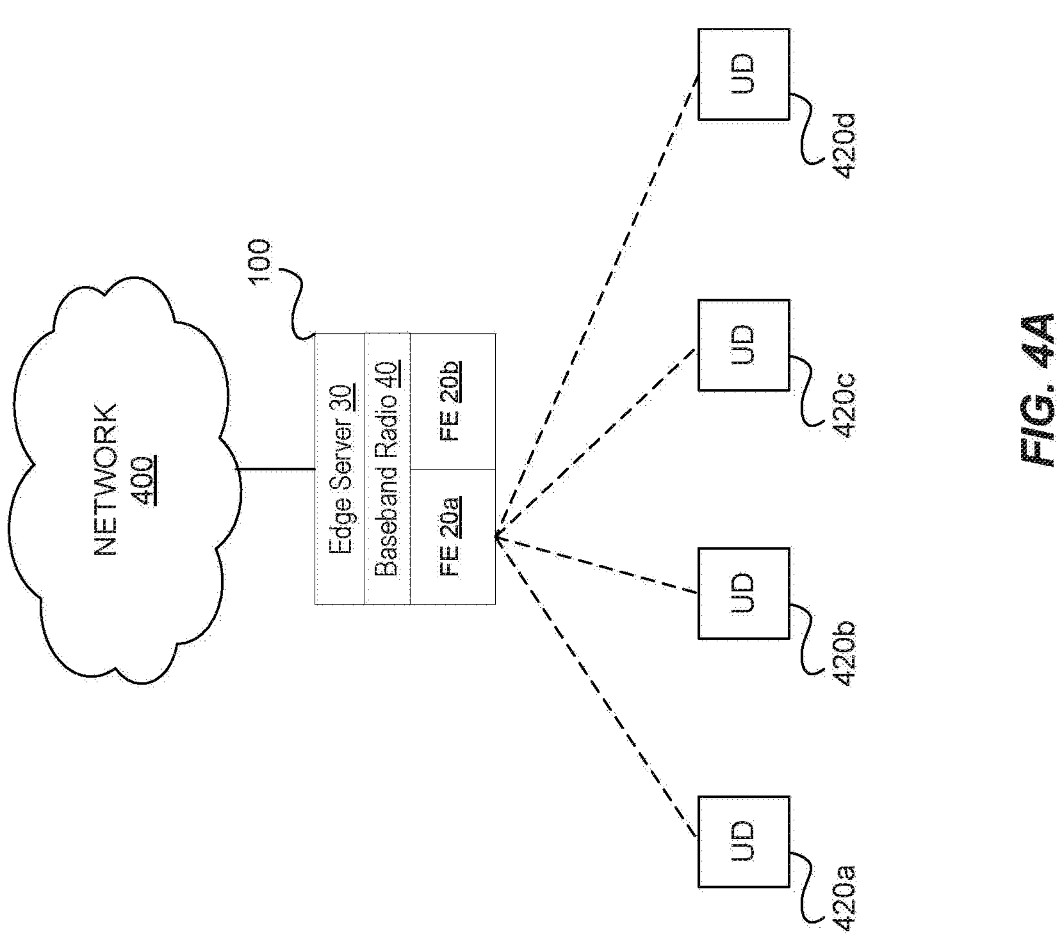
Figure 4B:
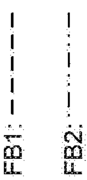
Figure 4B:
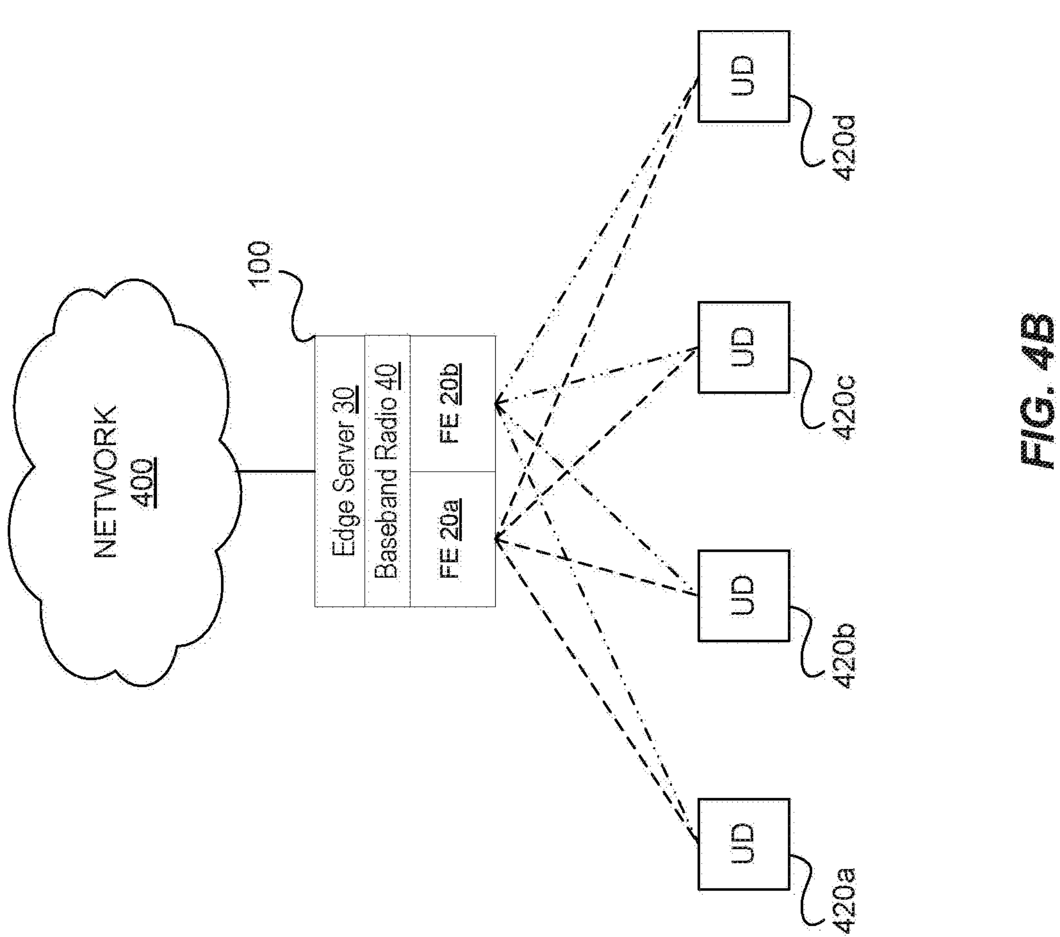
Figure 4C:
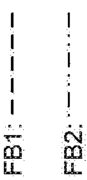
Figure 4C:
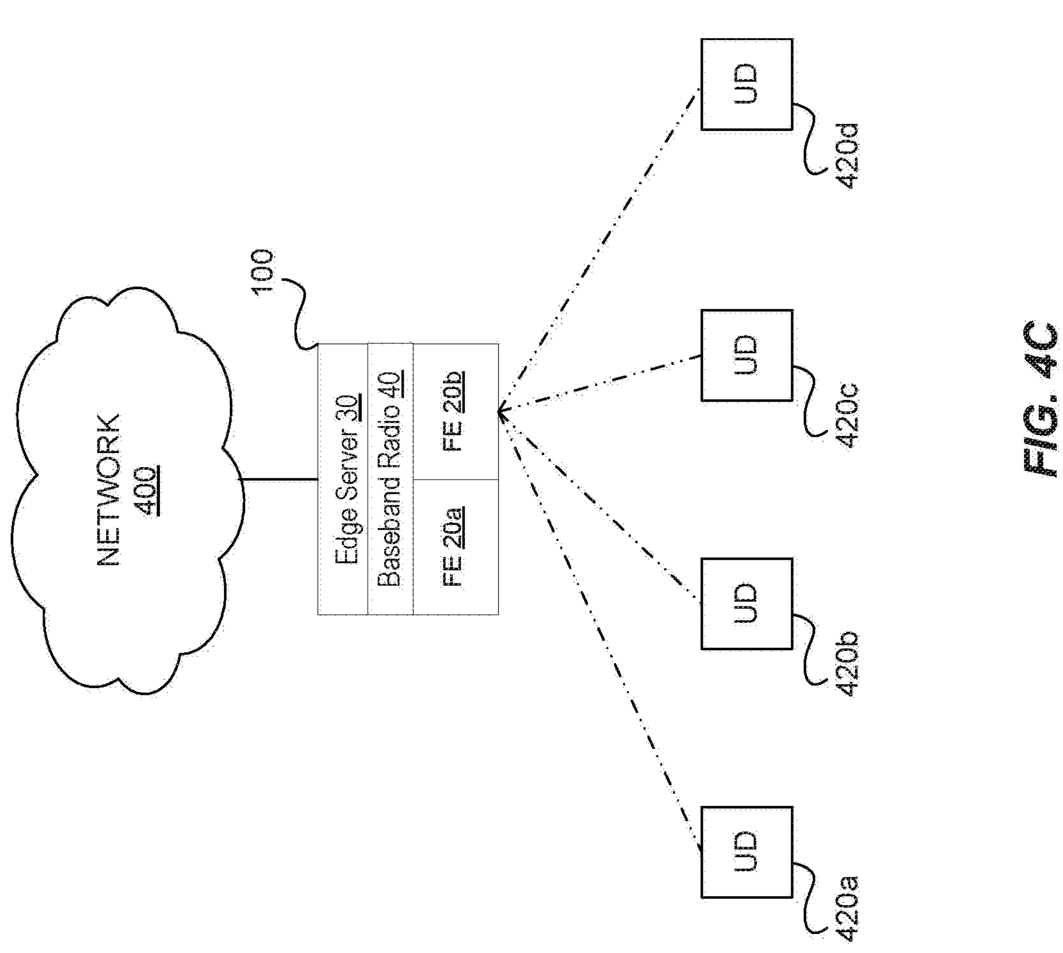

FIGS. 4A-4C are diagrams illustrating a PCBS 100, including two RF front end (FE) modules 20, according to certain exemplary embodiments. In FIGS. 4A-4C, the PCBS 100 may be communicatively connected with a plurality of user devices (UDs) 420 (e.g., UD 420*a*, UD 420*b*, UD 420*c*, and UD 420*d*) and a network 400.

UDs 420 may be any type of electronic device and/or component configured to wirelessly communicate data and/or voice, many of which are known in the art. UDs 420 can include, by way of example and not limitation, client computing devices, desktop computers, laptop computers, network computers, workstations, sensors, personal digital assistants (PDA), tablet computers and/or electronic readers (e.g., iPad, Kindle, Playbook, Touchpad, etc.), telephony devices, smartphones, wireless base stations, wireless access devices, pagers, music playing devices (e.g., iPod, etc.), routers, hubs, cameras, printers, copiers, scanners, projectors, alarms, lights, home entertainment systems, audio/visual systems, home security devices, intercoms, domestic robots, appliances, HVAC systems, etc., or any component or sub-component of another UD 420 or assemblage, such as, for example, a car, a train, a plane, a boat, etc. Although not illustrated, UDs 420 can also include servers and/or databases. UDs 420 may be configured to transmit and/or receive information to and/or from other UDs 420 and/or PCBS 100 directly and/or indirectly.

Network 400 may be any appropriate network or other communication link that allows communication between or among one or more computing systems and/or devices, such as, for example, between two or more PCBSs 100 and/or between individual PCBSs 100 and other communication systems and/or networks. Network 400 may be wired, wireless, or any combination thereof. Network 400 may include one or more of, for example, a circuit-switched network, a packet-switched network, or any other suitable communication network or any combination thereof. In some embodiments, network 400 may include an IP Multimedia Core Network Subsystem (IMS). In some embodiments, edge server 30 may establish, maintain, and monitor the communication link(s) between the PCBS 100 and the network 400.

Referring to FIG. 4A, in operation, a wireless cellular network may be formed with the PCBS 100 and a plurality of UDs 420 in the wireless communication cell (e.g., macrocell) formed by the PCBS 100. The wireless cellular network may be formed using a selected one or more of the RF front end modules 20, operating at the different RF carrier frequencies. In the example of FIG. 4A, a first RF front end module 20*a* may form a cellular network operating at a first LTE frequency band FB1. For example, using the first RF front end module 20*a*, the PCBS 100 may establish wireless communication links with a plurality of UDs 420, and may transmit/receive communications at the first LTE frequency band FB1 to/from each of the plurality of UDs 420.

In addition, the PCBS 100 may automatically reconfigure an established cellular network to switch from one LTE frequency band to another. For example, referring to FIGS. 4B and 4C, after establishing a cellular network and related wireless communication links with UDs 420 using a first RF front end module 20*a* operating at the first LTE frequency band FB1, the PCBS 100 may (a) initiate and establish new duplicative wireless links between the same UDs 420*a* to 420*d* using a second RF front end module 20*b* operating at a second LTE frequency band FB2, and (b) subsequently shutdown wireless communications (and associated wireless links) established with the first RF front end module 20*a*. Handoff operations may thus be performed in a manner similar to those performed when a UD 420 moves from one cell to a neighboring cell in a conventional cellular network, however, the handoff operations performed by the PCBS 100 may be performed for UDs 420 remaining in the same cell (e.g., coverage area of the PCBS 100), and with respect to the same baseband radio 10, but with respect to use of different RF front end modules 20*a* and 20*b* to replace a wireless link between PCBS 100 and UDs 420 with a newly formed wireless link.

For example, a first eNodeB may correspond to a first module of the baseband radio 10 and a first RF front end module 20*a* operating as described herein to process a first OFDM broadband signal (e.g., at the first LTE frequency band FB1). A second eNodeB may be implemented with a second module of the baseband radio 10 and a second RF front end module 20*b* to establish a second OFDM broadband signal (e.g., at the second LTE frequency band FB2). Handoff may be made between wireless links established using the first eNodeB to corresponding newly-established wireless links using the second eNodeB. In some examples, use of a virtual X2 interface according to LTE and its functionality may be employed within the PCBS 100 (i.e., the X2 interface and related functionality may be employed within housing 60 without interfacing with a different PCBS 100). Thus, switching from an existing wireless link between PCBS 100 and UDs 420 at one LTE band to a newly-established wireless link between PCBS 100 and UDs 420 at a different LTE band may be performed automatically without interrupting communications between PCBS 100 and UDs 420.

In some embodiments, the transition from a first RF front end module (e.g., front end module 20*a*) operating in a first LTE frequency band to a second RF front end module (e.g., front end module 20*b*) operating in a second LTE frequency band may be performed based on one or more selection criteria. For example, the one or more selection criteria upon which a decision to select a particular LTE frequency band or transition from one LTE frequency band to another may be, for example, current or desired/expected operational conditions and current or desired/expected operational parameters. The one or more selection criteria may include, but are not limited to: geographic location (e.g., GPS data, etc.), which may be overlaid with map data (e.g., land borders, etc.); weather (e.g., overcast skies, clear skies, etc.), including actual or expected changes to weather; terrain or topography (e.g., flat topography, hilly topography, buildings, etc.) including actual or expected changes to terrain or topography; actual or projected numbers of user devices (e.g., UDs 420) in the communication cell; actual or projected distances between the PCBS 100 and one or more user devices (e.g., UDs 420); measured or calculated strength of transmitted/received signals between the PCBS 100 and one or more of the user devices (e.g., UDs 420); size or range of a communication cell, including desired changes to size or range of the cell; threshold signal-to-noise ratios (SNR); RF congestion predictive analysis based on real time SNR; power availability and/or power consumption associated with different LTE frequency bands; interference with other RF signals and/or external actors (e.g., network congestion, conflict with other mobile stations, jamming equipment, etc.); etc.

In other embodiments, a user may select an LTE band or several LTE bands in which to form a single cellular network. User selection may be performed in several ways, such as, for example, by use of a user interface (not shown) to select a corresponding mode of operation by the PCBS 100. For example, an administrator user may input a user selection into a user interface, and the input user selection may be provided to the PCBS 100 via network 400. As another example, an initial RF front end module 20 may be preselected and data corresponding to the preselected RF front end module 20 may be stored in memory of the edge server 30. User selection may be made based on one or more of the selection criteria discussed above.

In some examples, the PCBS 100 may be configured to operate using a bandwidth less than its maximum bandwidth. For example, half or more of the RF front end modules 20 in a given PCBS 100 may be kept dormant, and related OFDM broadband communications provided in LTE bands of the dormant RF front end modules 20 may be left unused until a handoff event occurs. When a handoff event is determined to be appropriate, after the handoff, a new subset of the RF front end modules 20 (e.g., half or more) may be kept dormant. In this way, signature reduction of the PCBS 100 may be provided to reduce chances of detection, which may be of significant importance to warfighters in a battlefield environment.

RF front end modules 20 that are dormant to prevent transmitting an OFDM broadband signal (e.g., Tx dormant) may be operational for receiving and monitoring RF of the Tx dormant RF front end module 20. When operating in this Tx dormant manner, although no wireless links may be established with the Tx dormant front end module 20, the RF signal received and processed by the Tx dormant front end module 20 may be analyzed to evaluate a signal-to-noise ratio (SNR) in a SNR floor listening mode. Should the SNR floor suddenly rise to a new level, it may indicate that a jamming event is taking place to jam communications of the PCBS 100 (with respect to the operation of other RF front end modules 20 at other LTE bands). Thus, in response to detecting an increase of the SNR floor to a new level (e.g., a certain threshold, such as a predetermined percentage increase over the originally detected SNR), the PCBS 100 may automatically perform handoff operations from established wireless links using a first front end module and a first LTE band (e.g., front end module 20*a* operating in the first LTE frequency band FB1, as illustrated in FIGS. 4A-4C) to newly established corresponding wireless links using a second front end module and a second LTE band (e.g., front end module 20*b* operating in the second LTE frequency band FB2, as illustrated in FIGS. 4A-4C), and terminate the original wireless lines using the first front end module and the first LTE band (e.g., front end module 20*a* operating in the first LTE frequency band FB1, as illustrated in FIGS. 4A-4C).

Figure 5:
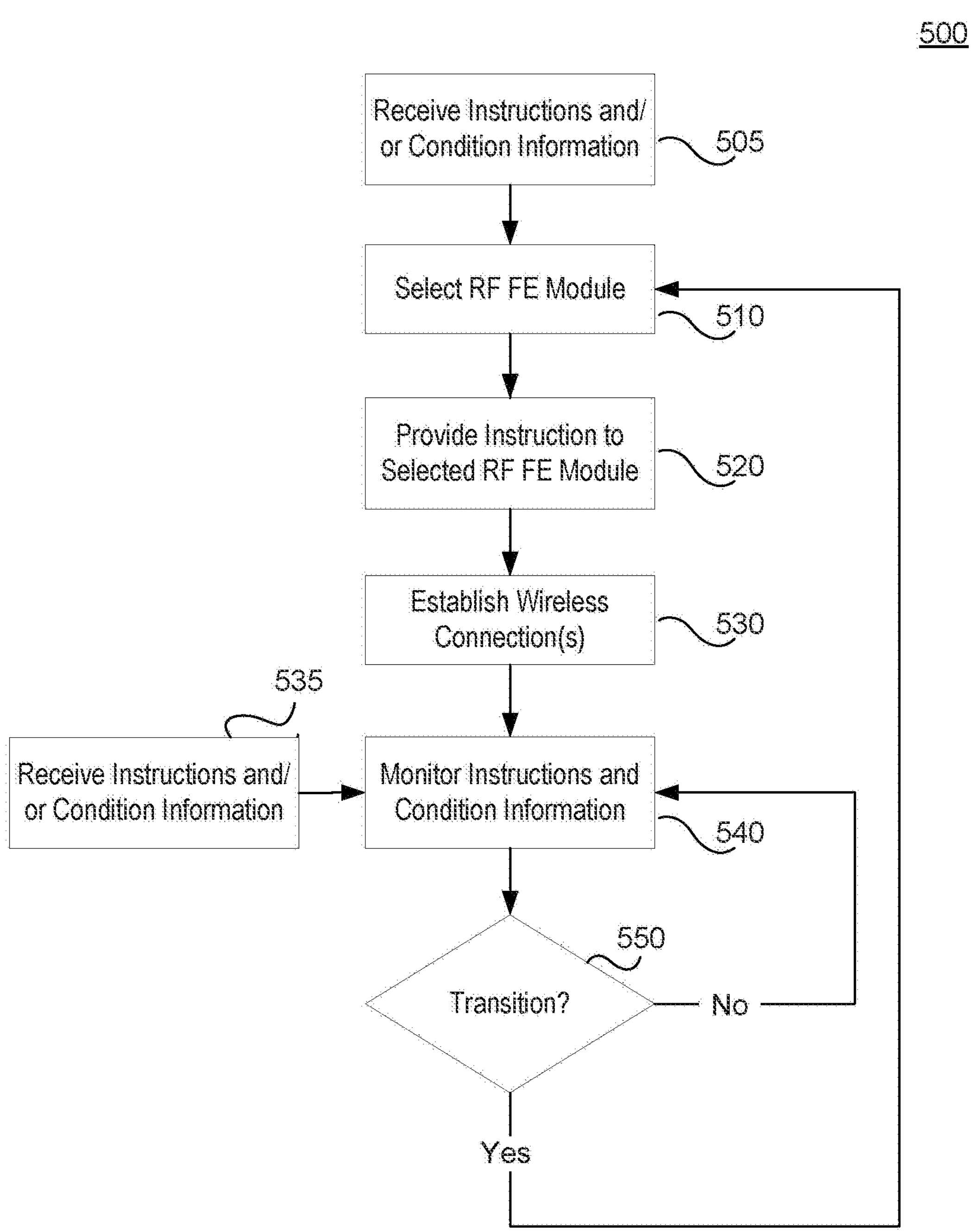
FIG. 5 is a flowchart illustrating an exemplary connection and communication process in a multi-modal communication system, according to certain example embodiments.

FIG. 5 is a flowchart 500 illustrating an exemplary connection and communication process using PCBS 100 in a mobile communication system, according to certain example embodiments.

Referring to FIGS. 4A and 5, the edge server 30 of PCBS 100 may receive instructions and/or condition information (step 505). The instructions and/or condition information may be received by the edge server 30 of the PCBS 100. Instructions may include, for example, commands from an administrator user to transition to a different frequency band (e.g., transition from a first frequency band in which the PCBS 100 is currently communicating with one or more UDs 420 to a second frequency band). Such instructions may be received via a user interface (not illustrated). The user interface may be physically connected to PCBS 100 or may be communicatively connected to PCBS 100 through, e.g., network 400.

Condition information may be received from one or more external sources and/or from one or more internal processes. For example, external sources may provide edge server 30 with current location information (e.g., GPS data) or a weather forecast. In addition, external sources (e.g., administrator user) may provide edge server 30 with new operational parameters or conditions. For example, the administrator user may provide the edge server 30 with information about an upcoming change in the geographic location in which the PCBS 100 will operate. As another example, the administrator user may provide the edge server 30 with information about other PCBSs 100 that may be expected to operate within the current geographic location (e.g., for deconfliction purposes). Condition information provided from the one or more external sources may be received via network 400.

In some embodiments, condition information may be provided from one or more processes operating on edge server 30. For example, processes operating on the edge server 30 may evaluate a SNR and any changes thereto (e.g., elevation of SNR floor, as discussed above). As another example, the situational awareness software server may provide geospatial mapping data, surrounding land formation data, navigation data, etc. As a further example, end point connected devices (e.g., drones, end point data collection systems, etc.) may provide condition information.

Next, one of the RF front end modules 20 may be identified to form a first wireless connection between PCBS 100 and UDs 420 (step 510). In some embodiments, the edge server 30 may make the selection of the desired RF front end module 20. The selection may be made based on any combination of received instructions, condition information and/or stored data that is available to the edge server 30, such as that received in step 505.

Once the RF front end module 20 has been identified, instructions may be provided to select the identified RF front end module 20 (step 520). The instructions may be sent from the edge server 30 to the baseband radio 10, which may then select the identified RF front end module 20 via the system's interposer board 40, which may include up to four separate busses 42 designed to route information to the appropriate RF front end module.

The selected RF front end module 20 may establish first wireless connections between the PCBS 100 and one or more UDs 420 (step 530). The first connections may be established according to LTE protocols. For example, referring to FIG. 4A, the first RF front end module 20*a* may establish first wireless connections with one or more UDs 420 according to a first LTE frequency band FB1. Once the first wireless connections are established between the selected RF front end module 20 of the PCBS 100 and the one or more UDs 420, communications between the PCBS 100 and the one or more UDs 420 may commence. The communications may include transmission/reception of voice and data between the PCBS 100 and the one or more UDs 420 at the first LTE frequency band FB 1. Once the first connections are established, instructions and condition information may continue to be received (step 535). The instructions and condition information may be received by edge server 30, as discussed above in connection with step 505.

The edge server 30 may monitor and assess the received instructions and condition information (step 540). In some embodiments, the received or calculated condition information may be monitored and evaluated to determine if a predetermined value or set of values has been met or exceeded. For example, the edge server 30 may compare a calculated SNR with a threshold SNR value (e.g., a predetermined maximum SNR value), and may determine to transition from the first frequency band FB1 to the second frequency band FB2 when the threshold SNR value has been met or exceeded. As another example, the edge server 30 may compare received GPS data with mapping data, and may determine to transition from the first frequency band FB1 to the second frequency band FB2 if a geographic border has been crossed.

In further embodiments, if the administrator user inputs a desired frequency band, the edge server 30 may evaluate whether the current frequency band is the same as the desired frequency band. If the current frequency band (e.g., first frequency band FB1) is not the same as the desired frequency band (e.g., second frequency band FB1), the edge server 30 may determine to transition from the current frequency band to the desired frequency band.

If a decision is made not to transition from the first LTE frequency band to a second LTE frequency band (step 550, No), transmission and/or reception may be continued through the first connection at the first LTE frequency band, and any received instructions and condition information will continue to be monitored (step 540). In some embodiments, the monitoring of the received instructions and condition information may be performed by the edge server 30.

When a decision is made to transition from the first LTE frequency band to a second LTE frequency band (step 550, Yes), a second RF front end module 20 may be identified to form a second wireless connection between PCBS 100 and UDs 420 (step 510). Once the second RF front end module 20 has been identified, instructions may be provided to select the identified RF front end module 20 (step 520). The selected second RF front end module 20 may establish one or more second wireless connections between the PCBS 100 and one or more UDs 420 (step 530). For example, referring to FIG. 4B, the second connection may be established between the PCBS 100 and the one or more UDs 420 using the second RF front end module 20*b*. The second connection may be established according to LTE protocols. For example, the second RF front end module 20_b_ may establish a wireless connection with one or more UDs 420 at the second LTE frequency band FB2. Referring to FIG. 4C, when the second connection is established, the first connection may be disconnected.

In some embodiments, although not illustrated, the second RF front end module 20_b_ may not address the selection criteria and/or may not be functional, and the second RF front end module 20_b_ may be replaced by a third RF front end module (not illustrated). The third RF front end module 20 may operate in a third LTE frequency band, different from the first and second LTE frequency bands. For example, the second RF front end module 20_b_ may be removed from the housing 60, and the third RF front end module may be inserted into the space previously occupied by the second RF front end module 20_b_. In such embodiments, references to the second RF front end module 20_b_ may refer to the third RF front end module 20, which physically replaces the second RF front end module 20_b_.

In still further embodiments, although not illustrated, the PCBS 100 may contain only a single first RF front end module 20_a_, and this single RF front end module 20_a_ may not address the selection criteria and/or may not be functional. In such embodiments, the single first RF front end module 20_a_ may be replaced by a third RF front end module 20 (not illustrated). The third RF front end module 20 may operate in a third LTE frequency band. For example, the first RF front end module 20_a_ may be removed from the housing 60, and the third RF front end module 20 may be inserted into the space previously occupied by the first RF front end module 20_a_. In such embodiments, references to the second RF front end module 20_b_ may refer to the third RF front end module 20, which physically replaces the first RF front end module 20_a_.

As noted herein, the RF front end modules 20 may be detachably connected within the housing 60 and to the baseband radio 10 via the interposer 40. Thus, the PCBS 100 may be easily modified by an operator user to replace RF front end modules 20 with different RF front end modules 20 operating in different frequency bands. In some implementations, the invention may take the form of a portable cellular base station kit. The portable cellular base station kit may comprise the baseband radio 10, the embedded edge server 30, and power source 70 formed within housing 60. The housing 60 may comprise n connection slots (e.g., sets of pegs) for attaching n RF front end modules 20, where n is a number equal to or greater than 2. Each of the connection slots may be formed to physically attach an RF front end module (attach in a removable manner, e.g.) to the housing 60 (such as described herein, such as with respect to pegs and clasps, e.g.). The portable cellular base station kit may also comprise m RF front end modules 20 (with m being an integer equal to or greater than n), with each of the m RF front end modules 20 configured to operate at a different RF carrier frequency (e.g., at a different LTE band). From the m RF front end modules, a user may select n of the m RF front end modules 20 and attach them to the housing 60 using the n connection slots. The portable cellular base station kit may also comprise a signal connector, such as interposer board 40, to connect the RF front end modules to the baseband processor 12 to provide signal communications therebetween (as described herein).

For example and without limitation, the portable cellular base station kit may be provided with two or more RF front end modules 20 that respectively operate in the following LTE bands: Band 1 (1920-1980 MHz uplink, 2110-2170 MHz downlink), Band 2 (1850-1910 MHz uplink, 1930-1990 MHz downlink), Band 3 (1710-1785 MHz uplink, 1805-1880 MHz downlink), Band 4 (1710-1755 MHz uplink, 2110-MHz 2155 downlink), Band 5 (824-849 MHz uplink, 869-894 MHz downlink), Band 7 (2500-2570 MHz uplink, 2620-2690 MHz downlink), Band 8 (880915 MHz uplink, 925-960 MHz downlink), Band 10 (1710-2170 MHz), Band 12 (699-716 MHz uplink, 729-746 MHz downlink), Band 13 (777-787 MHz uplink, 746-756 MHz downlink), Band 17 (704-716 MHz uplink, 734-746 MHz downlink), Band 20 (832-862 MHz uplink, 791-821 MHz downlink), Band 25 (1850-1915 MHz uplink, 1930-1995 MHz downlink), Band 26 (814-849 MHz uplink, 859-894 MHz downlink), Band 28 (703-748 MHz uplink, 758-803 MHz downlink), Band 29 (717-728 MHz downlink), Band 30 (2305-2315 MHz uplink, 2350-2360 MHz downlink), Band 38 (2570-2620 MHz), Band 40 (2300-2400 MHZ), Band 41 (2496-2690 MHz), Band 66 (1710-1780 MHz uplink, 2110-2200 MHz downlink), and Band 71 (663-698 MHz uplink, 617-652 MHz downlink).

In the specific examples illustrated herein, only two RF front end modules 20 are shown as being implemented as part of the PCBS 100. However, it should be emphasized that more than two RF front end modules 20 are contemplated as being implemented as part of the PCBS 100 (and connected to the baseband radio 10 and baseband processor 12 as described herein). For example, four or more RF front end modules 20 may be removably attached to the housing 60 and have removably attached signal connections with the baseband processor 12. Thus, a PCBS 100 may be both (a) operable with multiple RF front end modules 20 at different LTE bands using only a single baseband processor 12 of a single baseband radio 10 and (b) configurable to select the desired RF front end modules 20 in a "plug-and-play" manner. It should be apparent that the physical structure of each RF front end module 20 may be the same, such that the physical and electrical connections of an RF front end module 20 may be used without modification no matter which physical slot the RF front end module 20 is connected to within the housing 60.

In some examples, PCBS 100 may provide macro-cell coverage. For example, coverage area provided by the PCBS 100 may have a range greater than two kilometers, such as within an area greater than 5 kilometers, greater than 10 kilometers and provide wireless links to user devices within a 35 kilometer range.

Exemplary embodiments of the disclosure provide mobile broadband communication systems with band agility. A PCBS 100 (e.g., portable and/or mountable on a vehicle) is provided with several MIMO RF front end modules operating at different RF carrier frequencies. The PCBS 100 may use a selected subset (e.g., one) of the RF front end modules to provide communication links to multiple users using standard user devices (e.g., cell phones or other handheld devices) and establish communications therebetween. Switching between the RF front end modules may be done automatically or by an operator user. Further, the MIMO RF front end modules may be detachable so that different RF carrier families may be used with the same baseband radio 10 to support use within different environments.

The PCBS 100 may be deployed to quickly establish a broadband communications network within a corresponding cell formed by the PCBS 100. Connection to an access point may be unnecessary in certain implementations.

The PCBS 100 may be portable. For example, the PCBS 100 may be carried by a human in a backpack. The PCBS 100 may also be mounted to a vehicle, such as a truck, an unmanned aerial vehicle (e.g., a drone) or to an unmanned ground vehicle. Different physical implementations of the PCBS 100 may be achieved with the baseband radio 10, embedded edge server 30, and RF front end modules 20, within different housings 60 (having different slot connections for attaching the RF front end module 20 in different configurations) and using different configurations of interposer board 40.

In some embodiments, an interposer board 40 may be used, but the disclosure is not limited thereto. For example, two LTE front end modules may be attached directly to a specialized baseband card containing hardware configured to perform the same function as that of an interposer board functioning as a separate item.

Although not shown, the PCBS 100 can include one or more mechanisms and/or devices by which the system can perform the methods as described herein. For example, the PCBS 100 can include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, etc. These mechanisms and/or devices can include any combination of hardware and/or software components and can be included, in whole or in part, in any of the components shown in the figures.

In one or more exemplary designs of PCBS 100, the functions described can be implemented in hardware, software, firmware, or any combination thereof. If implemented in software, the functions can be stored as one or more instructions or code on computer-readable medium, including the computer-readable medium described above (e.g., RAM, ROM, storage media, etc.).

While the disclosure has been shown and described with reference to example embodiments thereof, it will be understood that various changes in form and details may be made therein without departing from the spirit of the disclosure.

What is claimed is:

1. A method of operating a mobile wireless communication station, the method comprising:

establishing a first wireless communication link between a first RF front end module detachably connected to a digital baseband radio and a user device at a first RF frequency band, wherein the first RF frequency band is associated with an RF carrier frequency of a wireless cellular network implemented using at least the first RF front end module and an edge server included in the mobile wireless communication station;

establishing a second wireless communication link between a second RF front end module detachably connected to the digital baseband radio and the user device at a second RF frequency band different from the first RF frequency band;

receiving, by the digital baseband radio, first data for transmission to the user device;

selecting, one of the first RF front end module or the second RF front end module;

converting, by the digital baseband radio, the first data into first digital transmission data;

converting, by the selected RF front end module, the first digital transmission data to first RF transmission data at a corresponding RF frequency band associated with the selected RF front end module; and transmitting, by the selected RF front end module, the first RF transmission data to the user device via a respective wireless communication link associated with the selected RF front end module.

2. The method of claim 1, further comprising:

identifying, by the edge server, one of the first RF front end module or the second RF front end module;

based on the identifying, sending an instruction to the digital baseband radio to select one of the first RF front end module or the second RF front end module; and selecting, by the digital baseband radio, the identified RF front end module to perform data transmission based on the instruction.

3. The method of claim 1, further comprising:

receiving, by the edge server, a first user input including information associated with one or more desired features of one of the first RF front end module or the second RF front end module; and identifying, by the edge server, the selected RF front end module based on the first user input.

4. The method of claim 1, further comprising:

receiving, by the edge server, first condition information indicative of one or more operational conditions of one of the first RF front end module or the second RF front end module; and identifying, by the edge server, the selected RF front end module based on the first condition information.

5. The method of claim 1, wherein:

each respective RF front end module of a plurality of RF front end modules is detachably connected to an interposer board of the mobile wireless communication station; and the first digital transmission data is transmitted to the selected RF front end module via the interposer board.

6. The method of claim 1, wherein the first RF transmission data is transmitted to the user device via an antenna of the mobile wireless communication station.

7. The method of claim 1, further comprising:

receiving, by the digital baseband radio, second data for transmission to the user device;

selecting, one of the first RF front end module or the second RF front end module;

converting, by the digital baseband radio, the second data into second digital transmission data;

converting, by the second selected RF front end module, the second digital transmission data to a corresponding RF frequency band associated with the second selected RF front end module; and transmitting, by the second selected RF front end module, the second RF transmission data to the user device via a respective wireless communication link associated with the second selected RF front end module.

8. The method of claim 7, further comprising:

identifying, by the edge server, one of the first RF front end module or the second RF front end module;

sending a second instruction to the digital baseband radio to select the second selected RF front end module; and selecting, by the digital baseband radio, the second selected RF front end module to perform data transmission based on the second instruction.

9. The method of claim 7, further comprising:

receiving, by the edge server, second user input including information associated with one or more desired features of one of the first RF front end module or the second RF front end module; and identifying, by the edge server, the second selected RF front end module based on the second user input.

10. The method of claim 7, further comprising:

receiving, by the edge server, second condition information indicative of one or more operational conditions of one of the first RF front end module or the second RF front end module; and identifying, by the edge server, the second selected RF front end module based on the second condition information.

11. The method of claim 7, wherein:

each respective RF front end module of a plurality of RF front end modules is detachably connected to an interposer board of the mobile wireless communication station; and the second digital transmission data is transmitted to the second selected RF front end module via the interposer board.

12. A wireless communication station for wireless communication, comprising:

a housing;

an edge server configured to establish a wireless connection with a network and receive first data from the network for wireless transmission to a user device;

a baseband radio configured to receive the first data from the edge server and convert the first data to first digital transmission data;

a plurality of radio frequency (RF) front end modules removably attached to the baseband radio, each RF front end module of the plurality of RF front end modules operable in a respective different frequency band, wherein:

a first RF front end module of the plurality of RF front end modules establishes a first wireless communication link between the baseband radio and the user device at a first RF frequency band associated with an RF carrier frequency of the network, the network implemented using at least the first RF front end module and the edge server;

a second RF front end module of the plurality of RF front end modules establishes a second wireless communication link between the baseband radio and the user device at a second RF frequency band different from the first RF frequency band.

13. The wireless communication station of claim 12, wherein:

the edge server is further configured to select one of the first RF front end module or the second RF front end module in order to transmit the first data received from the network to the user device using a respective RF frequency band; and the selected RF front end module is further configured to transmit the first RF transmission data to the user device using the respective RF frequency band.

14. The wireless communication station of claim 13, wherein:

the edge server is further configured to receive second data from the network and select one of the first RF front end module or the second RF front end module to transmit the second data to the user device using a respective RF frequency band.

15. The wireless communication station of claim 14, wherein:

the baseband radio is further configured to receive the second data from the edge server and convert the second data to second digital transmission data; and the second selected RF front end module is further configured to receive the second digital transmission data from the baseband radio, convert the second digital transmission data to second RF transmission data, and transmit the second RF transmission data to the user device.

16. The wireless communication station of claim 12, wherein each respective RF front end module of the plurality of RF front end modules is configured to establish a respective communication link at a respective different frequency bands in response to an instruction received from the edge server.

17. The wireless communication station of claim 12, further comprising an interposer board provided in the housing, wherein each respective RF front end module of the plurality of RF front end modules is removably connected to the baseband radio via the interposer board.

18. The wireless communication station of claim 12, further comprising a plurality of RF antennas, each RF antenna of the plurality of RF antennas connected to a respective RF front end module of the plurality of RF front end modules.

19. The wireless communication station of claim 12, wherein:

the edge server is further configured to identify one of the first RF front end module or the second RF front end module and transmit an instruction to the digital baseband radio to select one of the first RF front end module or the second RF front end module; and the baseband radio is configured to select the identified RF front end module to perform data transmission based on the instruction.

20. The wireless communication station of claim 12, wherein the edge server is further configured to:

receive a first user input including information associated with one or more desired features of one of the first RF front end module or the second RF front end module; and identify one of the first RF front end module or the second RF front end module based on the first user input.

* * * * *